United States Patent [19]

Holik

[11] 4,317,896

[45] Mar. 2, 1982

[54] FOUNDRY NO-BAKE COMBINATION RESIN BINDER

[75] Inventor: Melville J. Holik, Franklin Park, Ill.

[73] Assignee: International Minerals & Chemical Corp., Terre Haute, Ind.

[21] Appl. No.: 214,828

[22] Filed: Dec. 10, 1980

[51] Int. Cl.³ .............................................. C08L 61/14
[52] U.S. Cl. .................................... 525/501; 523/143; 523/145; 524/541
[58] Field of Search ............... 525/501; 261/DIG. 40; 260/38

[56] References Cited

U.S. PATENT DOCUMENTS

| | | | |
|---|---|---|---|
| 3,676,392 | 11/1972 | Robins | 260/38 |
| 3,726,867 | 4/1973 | Robins | 260/30.4 |
| 3,966,670 | 6/1976 | Grazen et al. | 260/38 |
| 4,116,916 | 9/1978 | Holik | 260/33.2 R |
| 4,172,068 | 10/1979 | Holik et al. | 260/33.2 R |

*Primary Examiner*—Theodore E. Pertilla
*Attorney, Agent, or Firm*—Robert H. Dewey

[57] ABSTRACT

A binder for foundry aggregate capable of being catalytically cured with a polyisocyanate and an alkaline catalyst comprising in combination, as a major portion, a butylated phenol-formaldehyde resin, a lesser amount of a resole resin and a still lesser amount of a novolac resin.

3 Claims, No Drawings

FOUNDRY NO-BAKE COMBINATION RESIN BINDER

BACKGROUND OF THE INVENTION

This invention relates to a rapid no-bake binder composition for a foundry aggregate. In a particular aspect, this invention relates to a rapid-cure resin composition for use in preparing cores and molds for foundry operations.

Cores useful in making metal castings are customarily made by placing a foundry aggregate, usually silica sand which has been admixed with a suitable binder, against a shape or pattern and then hardening the binder, as by polymerization. The resulting core is a self-supporting structure which forms a part of a mold assembly.

The cores themselves are made by a variety of processes employing a wide variety of binders. One of the processes in commercial use today is generally known as the rapid no-bake process. In this process, a resinous binder is mixed with a catalyst and sand and placed in a core box or a mold. It cures rapidly at ambient temperatures and can be stripped from the core box or mold in a matter of a few minutes. Binders of this type have been described by M. J. Holik, U.S. Pat. No. 4,116,916; M. J. Holik and J. F. Kraemer, U.S. Pat. No. 4,172,068 and J. Robins, U.S. Pat. Nos. 3,676,392 and 3,726,867.

SUMMARY OF THE INVENTION

It is an object of this invention to provide a no-bake binder composition for a foundry aggregate.

It is another object of this invention to provide a rapid cure binder composition for a foundry aggregate for use in preparing cores and molds for foundry operations.

Other objects of this invention will be apparent to those skilled in the art from the disclosure herein.

It is the discovery of this invention to provide a 3-component resin combination which is capable of being catalytically cured with a diisocyanate. The resin combination comprises a major portion of a butylated phenol-formaldehyde resin, a lesser amount of a resole resin, and a still lesser amount of a novolac resin.

DETAILED DISCUSSION

Phenolic resins, obtained by the condensation of a phenolic compound with an aldehyde, are generally divided into two categories, the "novolac" resins and the "resole" or A-stage resins. Novolac resins are permanently soluble, fusible resins in which the polymer chains have phenolic end-groups. They can be cured to insoluble, infusible products upon the addition of a source of formaldehyde, such as hexamethylenetetramine or paraformaldehyde. Novolac resins are prepared using acid catalysts and an excess of phenol.

Resole resins are prepared using an alkaline catalyst with excess formaldehyde and the resulting polymer has pendant methylol groups. Since each methylol group constitutes a potential cross-linking site, the resole resins are readily converted to cross-linked, infusible polymers by heating. Conversely, these resins are highly unstable.

The butylated phenol-formaldehyde resin of this invention can be any butylated phenol-formaldehyde resin which performs satisfactorily. A preferred resin is that described by M. J. Holik in U.S. Pat. No. 4,116,916, which is incorporated herein by reference thereto. In general, such a resin is prepared by reacting phenol with formaldehyde in a 2-stage reaction. The first stage is carried out in the presence of a fairly strong acid, and the second stage is carried out at near-neutral conditions. The resinous product is then dehydrated by azeotropic distillation and is then butylated by reaction with butanol. A butylated resin contributes a nominally good character to both resin bars and cores but is not entirely satisfactory because it tends to be brittle and lacks toughness. In the present system, it serves as a good basic performer and contributes overall homogeneity and plasticization in the cured resin.

The novolac resin useful in the practice of this invention can be any novolac known in the art but preferably it is a low melting novolac. A typical resin will be prepared in a mole ratio of formaldehyde to phenol of about 0.65. Such a resin is most suitable because the solubility and viscosity are in the best range for a desirable product. The novolac resin gives good tensile strength in resin bars and forms a hard surface when cured.

A novolac resin used in conjunction with a butylated phenol formaldehyde resin does not provide good sand compaction, tensile strength and scratch resistance in sand bodies. However, the inclusion of the resole gives smooth sand surface and good tensile strength to sand bodies when used in conjunction with a novolac. The resole resin useful for the practice of this invention is a conventional resole resin prepared by any process known in the art.

This three component system can react with a polyisocyanate in the presence of a tertiary amine to form a hard, strong polymer suitable for binding sand or other foundry aggregate for the purpose of preparing cores or molds for use in casting metal in foundry practice. Polymerization occurs rapidly at room temperature without the need of external energy. Preferably the resin system is in the form of a solution such as a ketone, an ester or an ether adjunct such as an acetal or ketal, or mixtures thereof. The polyisocyanate should also be in the form of a solution and the solvent should be the same as used for the resin to ensure homogeneity. A particularly preferred solvent is butylal.

The polyisocyanates which can be used in accordance with this invention are those known to be useful in the preparation of foundry core binders. Such polyisocyanates include the aliphatic polyisocyanates such as hexamethylene diisocyanate, alicyclic polyisocyanates such as 4,4'-dicyclohexylmethane diisocyanate and aromatic polyisocyanates such as, e.g., toluene diisocyanates, diphenylmethyl diisocyanate, and the dimethyl derivatives thereof, polymethylenepolyphenol isocyanates and chlorophenylene-2,4-diisocyanate. Preferred, however, is the use of commercially available compositions which contain diphenylmethane diisocyanate and triphenylmethane triisocyanate. These polyisocyanates are used in conventional amounts, e.g. from about 80 to 125% by weight of the resin.

The tertiary amines useful as catalysts in the practice of this invention are known in the art. Any tertiary amine known to be effective with the selected polyisocyanate can be used. Triethylamine is commonly used. A preferred amine catalyst is phenylpropylpyridine. These amines are used in art-recognized amounts, e.g. from 0.0001 to 0.04% by weight of the resin.

The invention will be better understood with reference to the following examples. It is understood that these examples are intended only to illustrate the invention and it is not intended that the invention be limited thereby.

EXAMPLE 1

Phenol (U.S.P. grade) 30 lb (0.319 moles) was delivered to a reaction vessel and heated until molten. n-Butanol 8 lb (0.111 moles) was added and heating continued to 150° F. There was then added 50% aqueous hypophosphoric acid 42 g and 91% paraformaldehyde 15 lb 12 oz (0.478 moles). The temperature was then raised to 235° F. until the paraformaldehyde dissolved, at which time the temperature was lowered to 215° F. and maintained there until the free formaldehyde content was reduced to 12% or below. There was then added 50% aqueous potassium hydroxide in four increments fifteen minutes apart. The first two were of 30 g each and the second two were of 16 g each, for a total of 92 g. The heating was continued to a free formaldehyde content of 6.5% or less. Then n-butanol 17 lb (0.23 moles) were added. The temperature was then raised to 265° F. at atmospheric pressure to remove the butanol-water azeotrope. The temperature was then lowered to 235° F. and the pressure was reduced to 25 inches of mercury to remove the remaining water and butanol. The liquid resin was designated PK-73.

The following binder mixture was prepared:

| | | Solids | |
|---|---|---|---|
| Ingredient | Amount | In Formulation | On Solids Basis |
| PK-73 | 32% | 25.6% | 47% |
| Isophorone | 15.7% | — | — |
| Resole Resin | 16.8% | 16.8% | 30.7% |
| Novolac Resin* | 24.4% | 12.2% | 22.3% |
| Butylal | 11.1% | — | — |

*50% in butylal.

The novolac resin had a formaldehyde to phenol ratio of 0.65. The viscosity of the mixture was 125 cps or F on the Gardner-Holdt scale.

Four tensile bars were prepared as follows:

A 20 g portion of the above binder mixture was mixed with 1.0 g of phenylpropylpyridine, which was supplied as a 25% solution in a solution of formaldehyde in butanol (butyl "Formcel", marketed by Celanese Chemicals Company in the presence of 20 g of a 77% solution of polydiphenylmethanediisocyanate in butylal. These ingredients were mixed for 20 seconds, then poured into a mold. It cured in 2 minutes to an opaque bar having a hard, shiny surface.

One bar, after aging 1 hour, had a tensile strength of 2175 psi. After aging overnight, the remaining three bars had tensile strengths of 3200, 3150 and 3050 psi, respectively.

A 12 g portion of the binder mixture was mixed with 0.6 g of phenylpropylpyridine (as a 20% solution in butyl "Formcel") and 1600 g of sand for 90 seconds. To this was added 11 g of a 77% solution of polydiphenylmethanediisocyanate in butylal and mixed for 30 seconds more. The mixture was cast in nine cores for three tests on three specimens each. The tensile strength was tested after varying cure times. Initially, three core specimens had a tensile strength of 150, 157 and 165 psi respectively. After 1 hour of cure time, the tensile strengths of three additional core specimens were 124, 150 and 186 psi respectively. Three more specimens after standing overnight had tensile strengths of 264, 167 and 261 psi respectively.

I claim:

1. A binder for foundry aggregate capable of being catalytically cured with a polyisocyanate and an alkaline catalyst comprising in combination as a major portion a butylated phenolformaldehyde resin, a lesser amount of a resole resin and a still lesser amount of a novolac resin.

2. The binder in claim 1 wherein the resole resin is present in an amount of about two-thirds that of the butylated resin and the novolac is present in an amount about half that of the butylated resin.

3. The binder of claim 1 wherein the novolac is prepared from formaldehyde and phenol in a mole ratio of 0.65.

* * * * *